United States Patent
Stuart et al.

(10) Patent No.: US 6,402,204 B1
(45) Date of Patent: Jun. 11, 2002

(54) QUICK CONNECT RETAINER WITH RECESSED LATCH FINGER

(75) Inventors: Timothy J. Stuart, Lapeer; Jamie T. Weinert, Grand Blanc, both of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/433,805

(22) Filed: Nov. 3, 1999

(51) Int. Cl.[7] ................................................. F16L 39/00
(52) U.S. Cl. ........................ 285/319; 285/308; 285/921
(58) Field of Search ................................ 285/319, 921, 285/308

(56) References Cited

U.S. PATENT DOCUMENTS

| 4,541,658 A | | 9/1985 | Bartholomew | |
|---|---|---|---|---|
| 4,893,845 A | | 1/1990 | Bartholomew | |
| 4,943,091 A | | 7/1990 | Bartholomew | |
| 5,002,315 A | * | 3/1991 | Bartholomew | ............. 285/921 |
| 5,195,787 A | * | 3/1993 | Bartholomew | ............. 285/319 |
| 5,441,313 A | | 8/1995 | Kalahasthy | ................. 285/93 |
| 5,626,371 A | | 5/1997 | Bartholomew | ............. 285/319 |
| 5,893,590 A | | 4/1999 | Klinger et al. | ............. 285/319 |
| 5,931,509 A | * | 8/1999 | Bartholomew | ............. 285/319 |

FOREIGN PATENT DOCUMENTS

| EP | 0756125 A1 | 1/1997 |
|---|---|---|
| WO | WO 91/11651 | 8/1991 |

* cited by examiner

Primary Examiner—Lynne H. Browne
Assistant Examiner—Aaron Dunwoody
(74) Attorney, Agent, or Firm—Young & Basile, P.C.

(57) ABSTRACT

A quick connect retainer having a pair of angularly disposed latch fingers extending radially inward from arcuate collars connecting a pair of legs extending axially from an annular base has a recess formed on a radially inner surface. The recess provides a substantially constant cross-sectional thickness to each latch finger between opposed ends of each latch finger. The recess forms a back-draft outer edge for mating with complimentary projections on a mold part to retain the latch fingers in position during separation of the mold halves during molding of the retainer.

4 Claims, 3 Drawing Sheets

QUICK CONNECT RETAINER WITH RECESSED LATCH FINGER

BACKGROUND OF THE INVENTION

1. Field of the Invention

The present invention relates, in general, to quick connectors and, more specifically, to retainer elements employed in quick connectors.

2. Description of the Art

Snap-fit or quick connectors are employed in a wide range of applications, particularly, for joining fluid carrying conduits in automotive and industrial applications. In a typical quick connector, a retainer is fixedly mounted within a bore in a housing of a female connector component. The retainer has a plurality of radially extending latch fingers which extend inwardly toward the longitudinal axis of the bore in the housing. A tube or fitting to be sealingly mounted in the bore in the female component includes a radially upset portion or flange, the rear surface of which abuts an inner peripheral surface of the retainer latch fingers. Seal and spacer members as well as a bearing or top head are typically mounted in the bore ahead of the retainer to form a seal between the housing and the tube when the tube is lockingly engaged with the retainer latch fingers.

The latch fingers in the prior art retainers typically have an enlarged cross section at the end of the latch finger connected to the arcuate connecting leg and a narrower or smaller cross section at an opposite end spaced from the annular base or collar of the retainer. The generally cantilevered shape of the pair of latch fingers requires a complex mold generally formed of two mold halves and a slider which forms the open interior of the retainer and the inner surface of the latch fingers.

In a typical molding process, after the plastic material has been injected into the mold to form the retainer, the mold halves are separated enabling the retainer to be removed from the slider. However, the thin nature of the latch fingers and their cantilevered configuration frequently causes the latch fingers to stick to the mold halves when the mold halves are opened. This can cause deformation of the latch fingers which results in a scrap retainer.

Further, the thickness of the latch fingers from end to end is generally nonuniform. The thicker end of the latch fingers at the attachment point to the arcuate connecting leg is difficult to mold and frequently results in bubbles or voids in the molded material again resulting in a reject or scrap retainer.

Thus, it would desirable to provide a latch finger construction for a quick connect retainer which overcomes the problems encountered in previous quick connect retainers. It would also be desirable to provide a latch finger construction for a quick connect retainer which eliminates sticking of the latch fingers from the mold halves when the mold halves are opened. It would also be desirable to provide a latch finger construction for a quick connect retainer which minimizes deformation of the latch fingers when the mold is opened to reduce scrap or reject retainers. It would also be desirable to provide a latch finger construction for a quick connect retainer which has a more uniform wall thickness throughout the length of each latch finger provide a more uniform shrinkage along the length of each latch finger. It would also be desirable to provide a latch finger construction for a quick connect retainer which achieves the above goals without requiring significant design modification to the conventional latch finger and/or retainer construction.

SUMMARY OF THE INVENTION

The present invention is an improved retainer for a quick connector which overcomes problems encountered in molding previously devised quick connector retainers.

The retainer of the present invention includes an annular base having an aperture for receiving one end of one of two conduits therethrough. Two pair of leg members extend axially from the base. Each pair of leg members are joined together at an opposite end by a collar. A latch finger extends angularly from one end of each leg member to an inner end radially inward, the inner end forming an abutment surface engagable with an annular flange on the conduit to lockingly join the two conduits together when the retainer is mounted in the housing.

A recess is formed on an inner surface of each latch finger, facing the recess on the opposed latch finger. The recess is engagable with complimentary projections on a mold part, such as a mold slide used to form the hollow interior of the retainer, during separation of the mold halves from the molded retainer to ensure that the latch fingers remain in position until fully hardened. This minimizes scrap retainers previously caused by sticking of the latch fingers to the mold halves during separation of the mold halves.

The recess also provides a more constant cross-sectional thickness between opposed ends for each latch finger thereby ensuring optimum molding of each latch finger to minimize the creation of voids or bubbled areas in the latch finger which previously led to increased scrap retainers.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
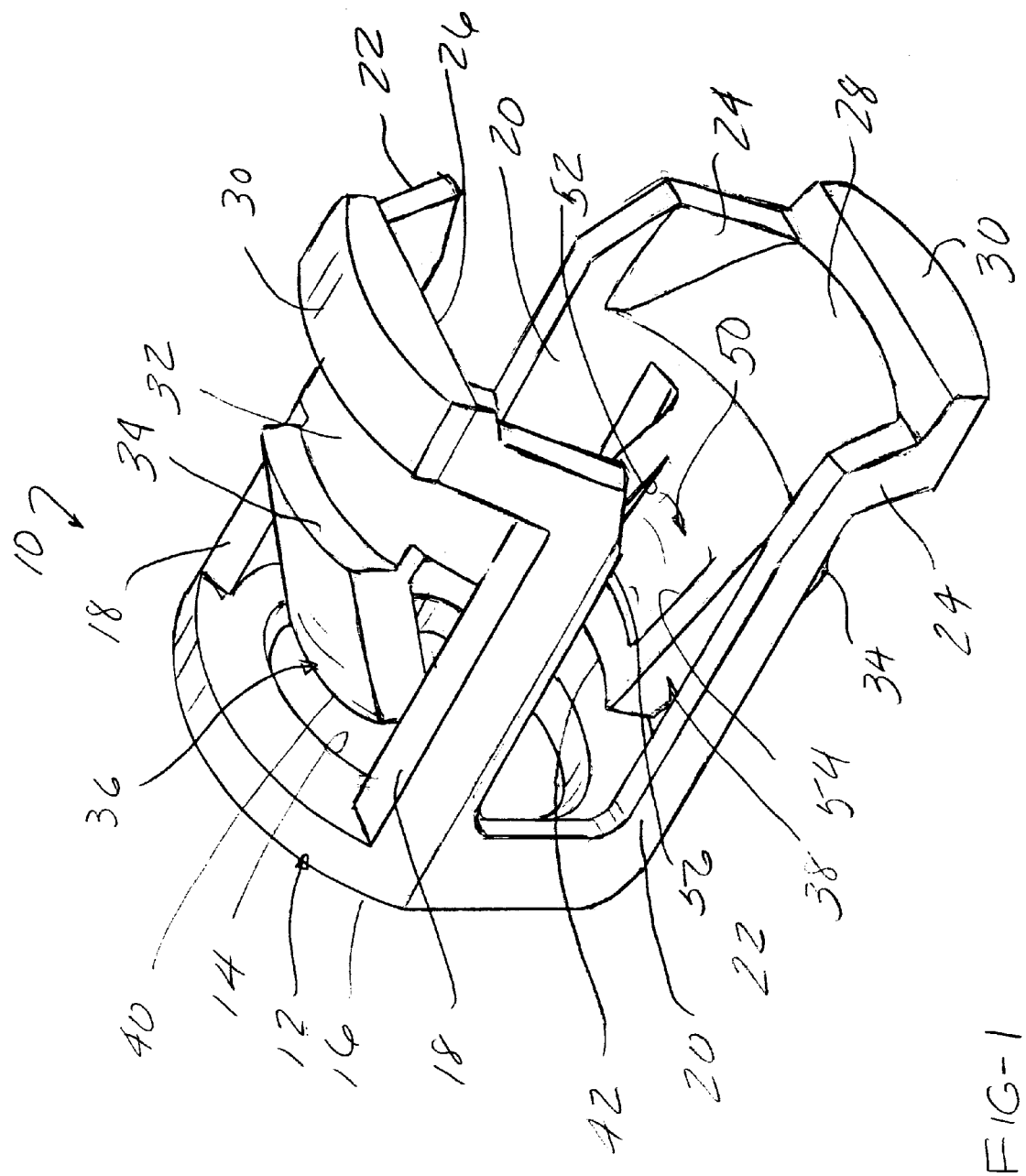
FIG. 1 is a perspective view of a quick connect retainer constructed in accordance with the teachings of the present invention.
Figure 2:
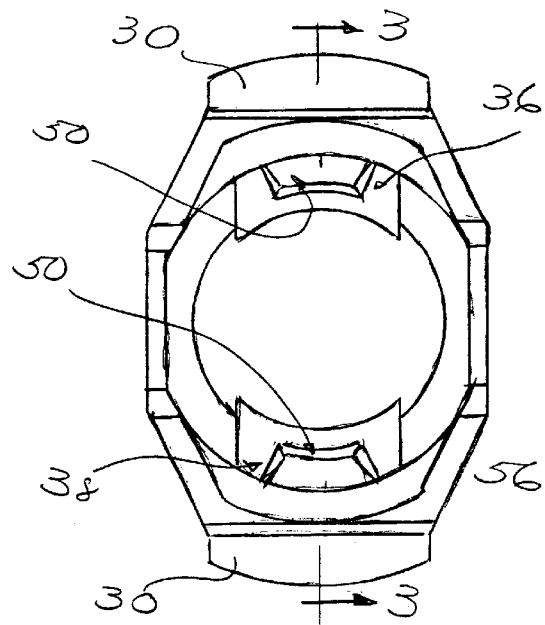
FIG. 2 is a right-hand end view of the retainer shown in FIG. 1.
Figure 3:
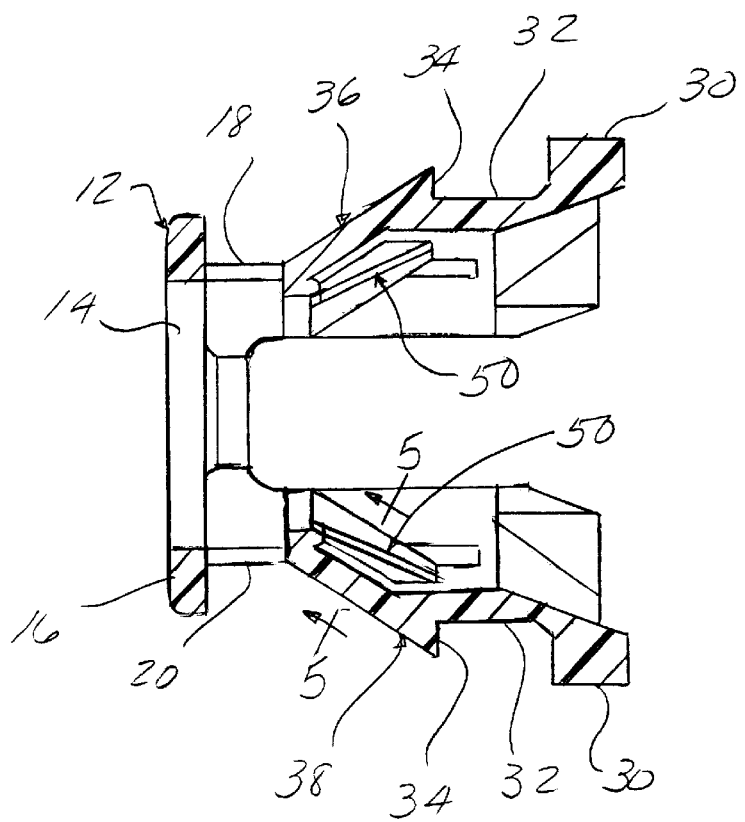
FIG. 3 is a cross-sectional view generally taken along line 3—3 in FIG. 2.
Figure 4:
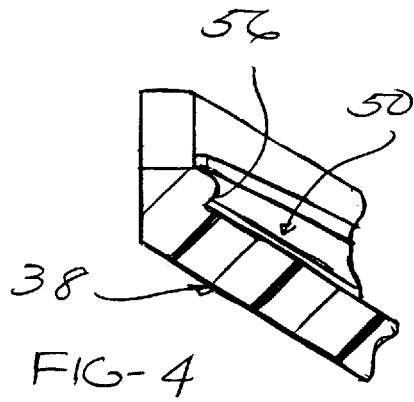
FIG. 4 is an enlarged cross-sectional view of the circled area of FIG. 3.
Figure 5:
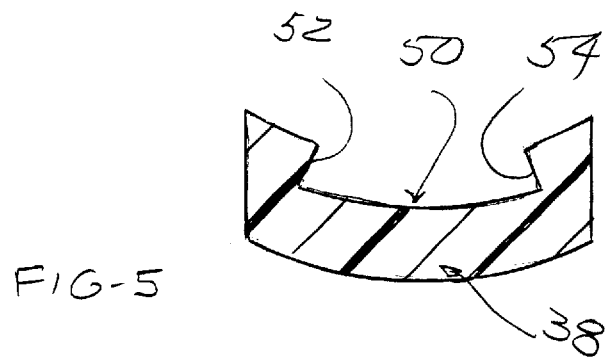
FIG. 5 is a cross-sectional view generally taken along line 5—5 of FIG. 3.

Referring now to the drawing, and to FIGS. 1–5 in particular, there is depicted a retainer 10 employable in a conventional fluid quick connector.

As is conventional, the retainer, as described in greater detail in U.S. Pat. No. 5,626,371, has an annular ring or base 12 with an aperture 14 extending therethrough sized to slidably receive one end of a tubular conduit or tube. A leading edge 16 of the base 12 seats against a shoulder formed in the stepped bore in a female housing as described in the above-identified US Pat. No. 5,626,371, the entire contents of which are incorporated herein by reference.

A plurality of legs arranged in two pairs 18 and 20 project axially from the base 12 generally parallel to a longitudinal axis extending through the aperture 14 in the base 12. The legs 18 and 20 form cantilevered beams projecting to outer ends 22 and 24, respectively, opposed from an end connected to the base 12.

An arcuate collar 26 and 28 respectively connects the ends 22 of the pair of legs 18 and the ends 24 of the pair of legs 20. The collars 26 and 28 have a generally arcuate shape. A raised or enlarged portion 30 is formed on each collar 26 and 28 and projects radially outward from a longitudinal axis of the retainer 10. The projections 30 extend radially outward above an adjacent recess 32 formed on the outer surface of each collar 26 and 28 by the raised portion 30 and one end 34 of a pair of latch fingers denoted generally by reference numbers 36 and 38, respectively.

The latch fingers 36 and 38 have a generally arcuate formed inner surface and, typically, a complimentary arcuate outer surface, by example only. Each latch finger 36 and 38 projects angularly inward from the recessed groove 32 on the outer surface of the collars 26 and 28, respectively, to respective leading ends 40 and 42 which are disposed radially inward toward the longitudinal axis of the retainer 10 relative to the arcuate collars 26 and 28. The leading ends 40 and 42 are adapted to engage one side or rear surface of a radial enlargement or radially outward extending annular flange formed on a tubular member inserted through the aperture 14 in the base 12 of the retainer 10 and into the stepped bore of the female housing or connector part as is conventional.

The pairs of legs 18 and 20 define deflectable, cantilevered legs with the corresponding arcuate collars 26 and 28 which are deflectable radially inward to allow insertion of the retainer 10 into one end portion of the stepped bore in the female housing. The recessed groove 32 formed on the outer surface of each collar 26 and 28 between the raised portion 30 and the adjacent raised end 32 of the latch fingers 36 and 38 is adapted to snap into a mating end portion of the female housing to releasably mount the retainer 10 in the housing. The enlarged portions 30 may again be deflected radially inward, after the conduit has been removed from the female housing to allow separation of the retainer 10 from the housing.

According to a unique aspect of the present invention, the inner surface of each latch finger 36 and 38 is formed with a recess 50 as shown in FIG. 1, and in greater detail FIGS. 2–6. The recesses 50, which may take one of a number of different shapes, is formed with a generally polygonal or square configuration, by example only, formed by a pair of opposed sidewalls 52 and 54 and an end wall 56. The sidewalls 52 and 54 taper from an end contiguous with the inner surface of the respective latch finger 36 and 38 to a larger height at an opposite end forming a corner with one end of the end wall 56.

The recess 50 may have other cross-sectional shapes as well as being formed continuously along the entire length of the inner surface of each latch finger 36 and 38 to the leading ends 40 and 42.

In forming the retainer 10 of the present invention, a pair of mating mold halves 60 and 62 are each provided with an inner mold cavity 64 and 66, respectively, having a shape or form of various elements of the retainer 10. In order maintain the open or hollow interior of the retainer 10, a movable slide or pin 68 is provided. The mold halves 60 and 62 close about the slide 68 when the slide 68 is in the extended position. Molten plastic is then injected into the interior of the mold cavities 64 and 66 and about the slide 68 to form the retainer 10 to the shape of the mold cavities 64 and 66 and the exterior surface of the slide 68.

Figure 6:
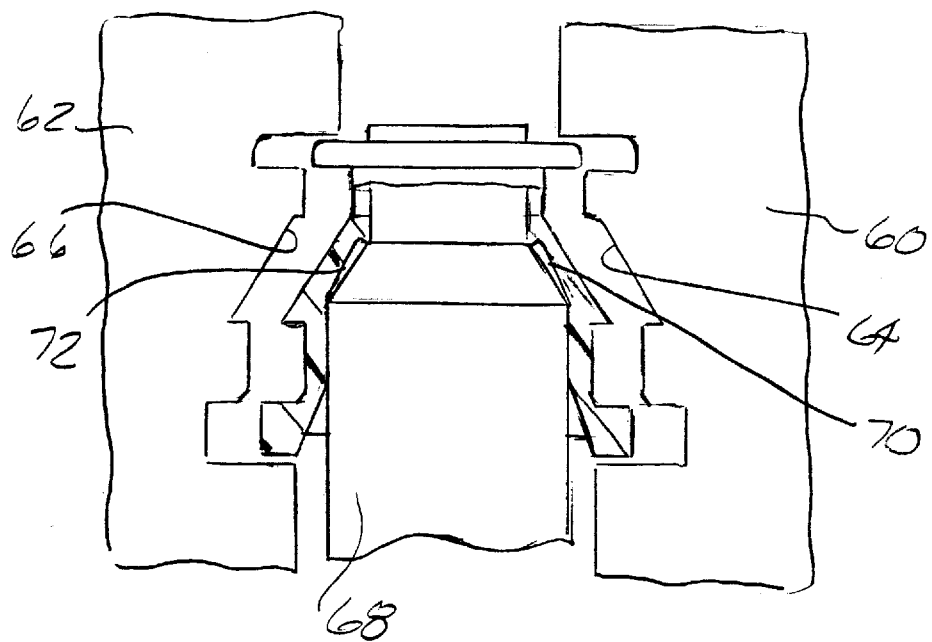
FIG. 6 is a pictorial representation of a molding process used to form the retainer of the present invention.

As shown in FIG. 6, the slide 68 is formed with a pair of projections 70 and 72. The projections 70 and 72 generally have the shape of the recess 50 as shown in FIG. 1. In this manner, an opening will be formed between the projections 70 and 72 and the adjoining inner surfaces of the mold cavities 64 and 66 of the mold halves 60 and 62 to form the latch fingers 36 and 38. When the latch fingers 36 and 38 are formed, the inner surface of each latch finger 36 and 38 will have a recess 50 formed by the projections 70 and 72.

After the molten plastic is allowed to cool to a harden state, the mold halves 60 and 62 are separated. Heretofore, this separation frequently causes the latch fingers 36 and 38 to pull away from the outer surfaces of the slide 68 due to sticking to the inner surfaces 64 and 66 of the mold halves 60 and 62. This results in deformation of the latch fingers 36 and 38 and usually leads to a scrap or reject retainer.

However, the notches 50 formed on each latch finger 36 and 38 form a draft surface with the projections 70 and 72 on the slide 68 thereby retaining the latch fingers 36 and 38 in position in engagement with the projections 70 and 72 on the slide 68 during separation of the mold halves 60 and 62. Once the mold halves 60 and 62 have been completely separated, the retainer 10 can be separated from the slide 68.

Another advantage of the recesses 50 is that the generally tapered cross section of the notches 50 along their respective length between opposed ends of the latch fingers 36 and 38 is more uniform or constant. This avoids a thick end portion on the latch fingers 36 and 38 where the latch fingers 36 and 38 join the arcuate collars 26 and 28. This minimizes the possibility of another cause of reject or scrap retainers since the molten plastic has a tendency to bubble when forming large thicknesses leading to voids in one end of the latch fingers 36 and 38.

In summary, there has been disclosed a unique retainer for a fluid quick connect or which has a latch finger configuration with an inner surface notch or recess which simplifies molding of the retainer to minimize scrap or rejected retainers as well as providing a more constant cross-sectional thickness along the length of the latch fingers.

What is claimed is:

1. A retainer for a quick connector joining two conduits and including a housing with aligned transverse apertures communicating with a through bore, one of the conduits having a radially extending flange spaced from one end insertable into a bore formed in the housing carrying the other conduit, the retainer comprising:

an annular base having an aperture for receiving one end of the one conduit therethrough;

pairs of leg member extending axially from the base, each pair of leg members joined at an opposite end by a collar;

a latch finger extending angularly from each collar to a leading end radially inward from the collar, the leading end forming an abutment surface adapted to be engagable with the annular flange on the conduit to lockingly join the conduit and the housing when the retainer is mounted in the housing, the latch finger having an inner surface; and a recess formed on an inner surface of each latch finger and facing the recess on the opposed latch finger, each recess having first and second end and an inner surface, the first end proximate the leading end of the respective latch finger and defined by an end wall extending from the inner surface of the latch finger to the inner surface of the recess, the second surface contiguous with the inner surface of the latch finger defining the recess with a first thickness at the first end, the thickness decreasing to the second end.

2. The retainer of claim 1 wherein the recess has a polygonal shape.

3. The retainer of claim 1 wherein the recess has a square shape.

4. The retainer of claim 1 wherein the recess extends partially through the thickness of each latch finger from a radially inward end to a radially outward end.

* * * * *